(12) United States Patent
Klomp et al.

(10) Patent No.: US 7,221,962 B2
(45) Date of Patent: May 22, 2007

(54) TELECOMMUNICATIONS RADIO SYSTEM FOR MOBILE COMMUNICATION SERVICES

(75) Inventors: Martin Willem Klomp, Spalt (DE); Germar Jochem Herbert, Nürberg (DE)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/516,863

(22) PCT Filed: Jul. 18, 2003

(86) PCT No.: PCT/EP03/08064

§ 371 (c)(1),
(2), (4) Date: Dec. 3, 2004

(87) PCT Pub. No.: WO2004/010724

PCT Pub. Date: Jan. 29, 2004

(65) Prior Publication Data

US 2005/0186990 A1    Aug. 25, 2005

(30) Foreign Application Priority Data

Jul. 22, 2002    (DE) ................. 102 33 172

(51) Int. Cl.
*H04M 1/00*    (2006.01)
(52) U.S. Cl. ................. 455/561; 455/562.1; 455/575.7; 343/700 MS; 343/878; 343/890; 343/844
(58) Field of Classification Search ................. 455/561, 455/562.1, 575.7; 343/878, 890, 844, 795, 343/700 MS, 826
See application file for complete search history.

(56) References Cited

U.S. PATENT DOCUMENTS

| 4,249,181 | A |   | 2/1981  | Lee .................. 343/100 CS |
| 5,200,759 | A | * | 4/1993  | McGinnis ................. 343/890 |
| 5,648,787 | A | * | 7/1997  | Ogot et al. ................. 343/826 |
| 5,757,324 | A | * | 5/1998  | Helms et al. ........ 343/700 MS |
| 6,088,002 | A | * | 7/2000  | Johnson et al. ............. 343/878 |
| 6,127,988 | A | * | 10/2000 | McNichol ................... 343/844 |
| 6,151,310 | A |   | 11/2000 | Dent ......................... 370/330 |
| 6,166,702 | A | * | 12/2000 | Audenaerde et al. ....... 343/795 |
| 2003/0003959 | A1 | * | 1/2003 | Tsui et al. ................. 455/561 |

FOREIGN PATENT DOCUMENTS

| EP | 0 531 090 A2  | 3/1993  |
| EP | 0 923 259 A2  | 6/1999  |
| EP | 0 998 156 A2  | 5/2000  |
| WO | WO 97/41622   | 11/1997 |
| WO | WO 01/20719 A1 | 3/2001  |

OTHER PUBLICATIONS

William C.Y. Lee et al, "The Propagation Characteristics in a Cell Coverage Area", 1997 IEEE 47th Vehicular Technology Conference, Phoenix, Arizona, May 4-7, 1997, vol. 3, Conf. 47, pp. 2238-2242.

* cited by examiner

*Primary Examiner*—Joseph Feild
*Assistant Examiner*—David Q. Nguyen
(74) *Attorney, Agent, or Firm*—Michaelson & Associates; Peter L. Michaelson

(57) ABSTRACT

The invention relates to a telecommunications radio system for mobile communication services. More specifically, the invention relates to covering large sectorized areas for mobile communication services.

23 Claims, 3 Drawing Sheets

TELECOMMUNICATIONS RADIO SYSTEM FOR MOBILE COMMUNICATION SERVICES

FIELD OF THE INVENTION

The invention relates to a telecommunications radio system for mobile communication services. More specifically, the invention relates to covering large sectorized areas for mobile communication services.

BACKGROUND OF THE INVENTION

It is known that mobile communication networks consist of a wireless radio network part and a fixed core network part. The wireless radio network part serves an area by enabling mobile stations in that area to wirelessly communicate with base stations. The base stations are connected to the fixed core network part.

In "Akari, K., 'Fundamental problems of nation-wide mobile radio systems', Review of the Electrical Communication Laboratory, Vo. 16 (1968), 357–373" and "Mac-Donald, V. H., 'The Cellular Concept', The Bell System Technical Journal, Vol. 58 (1979), 15–41" the area to be served is subdivided into uniform hexagons called cells, with a base station being positioned in the center of a cell. In the simplest case, signals are emitted via omnidirectional antennas from this center. Nowadays this is normally a triple sectorization, i.e. the cell is subdivided into three sectors via separate antennas fixed on the base station with each a 120-degree aperture angle. Each sector has a certain capacity, i.e. an average maximum number of mobile devices that can be served simultaneously per radio-frequency carrier in the sector.

The original homogenous cellular concept is generalized in several directions. An adaptation of the cell size to different traffic densities by reducing the diameter (cell splitting) has already been described in 'The Cellular Concept'.

In "Lorenz, R. W., 'Kleinzonennetze für den Mobilfunk', Nachrichtentechnische Zeitschrift, Vol. 31 (1978), 192–196" it is proposed to subdivide a cell into six sectors of 60 degrees each, as can be found in several mobile radio networks. In "Halpern, S. W., 'Reuse partitioning in cellular systems', Proc. 33rd IEEE Vehicular Technology Conference (1983), 322–327" omnidirectional and triple sectorized systems are subdivided once again into concentric rings. This concept is subsequently technically implemented by Nokia in the form of the "Intelligent Underlay-Overlay" feature for the GSM system. The same number of sectors in each of the concentric rings is characteristic of this concept.

In practice, there are more or less substantial deviations from the geometrical ideal shape of the relevant literature. This is caused by landscape, traffic and acquisition in the form of distortions of the hexagon geometry due to the non-ideal location of the base station. As a rule, the base station is nevertheless located at the center of the area served by it, subdividing the area into a maximum of six sectors.

The base stations are kept relatively low to the ground, i.e. below 50 m. High base stations are not considered since they cause high undesirable interferences when applying the above mentioned theories.

Omni-directional antennas are rarely used nowadays. Dual sectorization is used for straight-line coverage, such as road coverage and railway coverage.

From DE 100 06 621 A1 it is known that an antenna can be z-axis rotation symmetrically shaped. With this single antenna it is not possible to create sectorized cells according to existing standards such as GSM, TDMA, CDMA and UMTS.

From JP 2002186018A a system and method are known for dynamically varying traffic channel sectorization within a spread spectrum communication system. This enables varying the concentration of traffic channels in response to changes in the distribution of users within a spread spectrum cellular communications system. It does not provide a solution for creating radio coverage in an area.

From JP 2002107439A it is known that an arrival direction-estimating device can have eight directional antennas. These antennas are not suitable for creating radio coverage in an area.

The acquisition of UMTS licenses has been a great strain on the resources of telecommunication companies. There is a need to build an extensive UMTS radio network quickly, covering at least the bigger cities. There is however a lack of suitable sites to place base stations and there are considerable problems in subsequent negotiations for existing sites. Also there is a considerable loss of time due to necessary coordination with other parties and frequently repeated re-planning of the radio network.

Therefore an UMTS radio network construction will only be possible at a very slow pace and at great financial expenses. Moreover, it is expected that a network full of coverage holes will be the result.

PROBLEM DEFINITION

The construction of telecommunications radio systems for mobile communications services is time consuming and costly because many base stations are needed to be able to cover large areas.

AIM OF THE INVENTION

The aim of the invention is to be able to relatively quickly and economically create a telecommunications radio system for mobile communications services covering an area of any size and/or shape (e.g. a whole town or a country) with the possibility to relatively easily change the capacity in the covered area.

SUMMARY OF THE INVENTION

The present invention provides a solution to be able to relatively quickly and economically create a telecommunications radio system for mobile communications services covering an area of any size and/or shape (e.g. a whole town or a country) with the possibility to relatively easily change the capacity in the covered area. The invention can be applied in any telecommunications radio network using sectorized areas, such as among others GSM, TDMA, CDMA and UMTS.

According to an aspect of the invention a telecommunications radio system is provided for mobile communication services comprising at least one base station. The base station comprises at least two antennas and is located at a site. The base station covers an area, which is subdivided into a multitude of sectors by the antennas. There can be e.g. at least six sectors, at least 12 sectors, at least 24 sectors or at least 48 sectors.

Each sector can be served by a separate antenna or a multitude of sectors can be served by one or more phase-controlled antennas.

The total number of sectors needed to cover the area can be calculated as a function of the size of each sector and the required field strength in each sector.

The site is a high structure with a height of at least 50 m from erection ground, possibly in the range of 90 m to 320 m. The high structure can be e.g. a tower, chimney, radio tower, skyscraper or even a zeppelin hovering at a fixed location. The base station is located on the site at a height of at least 50 m, if possible in the range of 90 m to 320 m. Using a high site and creating a large number of sectors has the advantage that it makes it possible to cover a large area for mobile telecommunications services. Because there is a clean signal between the antenna and a mobile device (the signal is clean because the base station is located at such a high site that there is no interference from buildings surrounding the mobile device and because there are no surrounding base stations interfering) and because of a high trunking gain (because of the high number of sectors the antennas use small beams with high gain) even in urban areas large areas can be covered from the base station on the high site.

Antennas are arranged in a first concentric ring in a first orthogonal plane of the longitudinal axis of the site. Antennas can also be arranged in a second concentric ring in a second orthogonal plane of the longitudinal axis of the site, the second concentric ring having a larger diameter than the first concentric ring. Using two concentric rings has the advantage that sectorization can be very dense, ensuring sufficient power flow density at ground level and sufficient capacity in the covered area. The first orthogonal plane can be the same as the second orthogonal plane. The number of antennas on the second concentric ring can be larger than the number of antennas on the first concentric ring. The horizontal angular range of the antennas on the second concentric ring can be smaller than the horizontal angular range of the antennas on the first concentric ring. The vertical aperture angle of the antennas on the first concentric ring can be in the range of 8 to 12 degrees, preferably 10 degrees. The vertical aperture angle of the antennas on the second concentric ring can be in the range of 3 to 6.5 degrees, preferably 5 degrees. Using these settings has the advantage that a relative uniform power flow density of −21 dBm/square meter in the entire area to be covered can be achieved (assuming 10 W transmitting power per sector). Another advantage is that on a mobile phone this would correspond to a level of −49 dBm, which is adequate for indoor coverage as well.

The area can being subdivided into 24 sectors by antennas on the first concentric ring and 72 sectors by antennas on the second concentric ring. The shape and/or size of one or more sectors can be changed by switching on or off one or more antennas, by changing the horizontal angular range of one or more antennas, or by changing the vertical aperture angle of one or more antennas.

At least one antenna can be arranged in a third orthogonal plane of the longitudinal axis of the site to cover an area in the proximity zone of the site. The third orthogonal plane should be located below a height of 50 m.

All antennas operate at one frequency. A conventional base station operating at a different frequency can be placed within the area for handling locally high volumes of traffic.

A base station for use in a telecommunications radio system for mobile communication services comprising any of the above-described features is also provided.

An antenna for use in a base station for use in a telecommunications radio system for mobile communication services comprising any of the above-described features is also provided.

A mobile network comprising a telecommunications radio system for mobile communication services comprising any of the above-described features is also provided.

Apart from the fact that the present invention enables coverage of an area of any size and/or shape (e.g. a whole town or a country) with the possibility to relatively easily change the capacity in the covered area, the invention also possesses other advantages.

One significant advantage of the invention is that a homogenous network (without interference problems due to different propagation paths of different stations and path loss due to obstacles) can be built, making it possible to achieve high transmission capacities in the individual sectors. Due to overlapping at the edges of sectors it is possible to compensate the loss of power with the aid of macrodiversity and a good soft handover can be achieved.

Another advantage is that using a concentrated site, i.e. a high site from which a large area can be covered as described above, results in considerable savings in the fixed core network since fewer base stations need to be connected to the fixed core network. Other savings can be made in construction and maintenance time and costs, and in synergy from sharing extensive power supplies and cables. The construction of a base station at a concentrated site can be completed "overnight", resulting in a competitive advantage since an extensive and homogenous network without any gaps would be available immediately.

BRIEF DESCRIPTION OF THE DRAWINGS

The invention will be explained in greater detail by reference to exemplary embodiments shown in the drawings, in which.

DETAILED DESCRIPTION OF THE INVENTION

Figure 1:
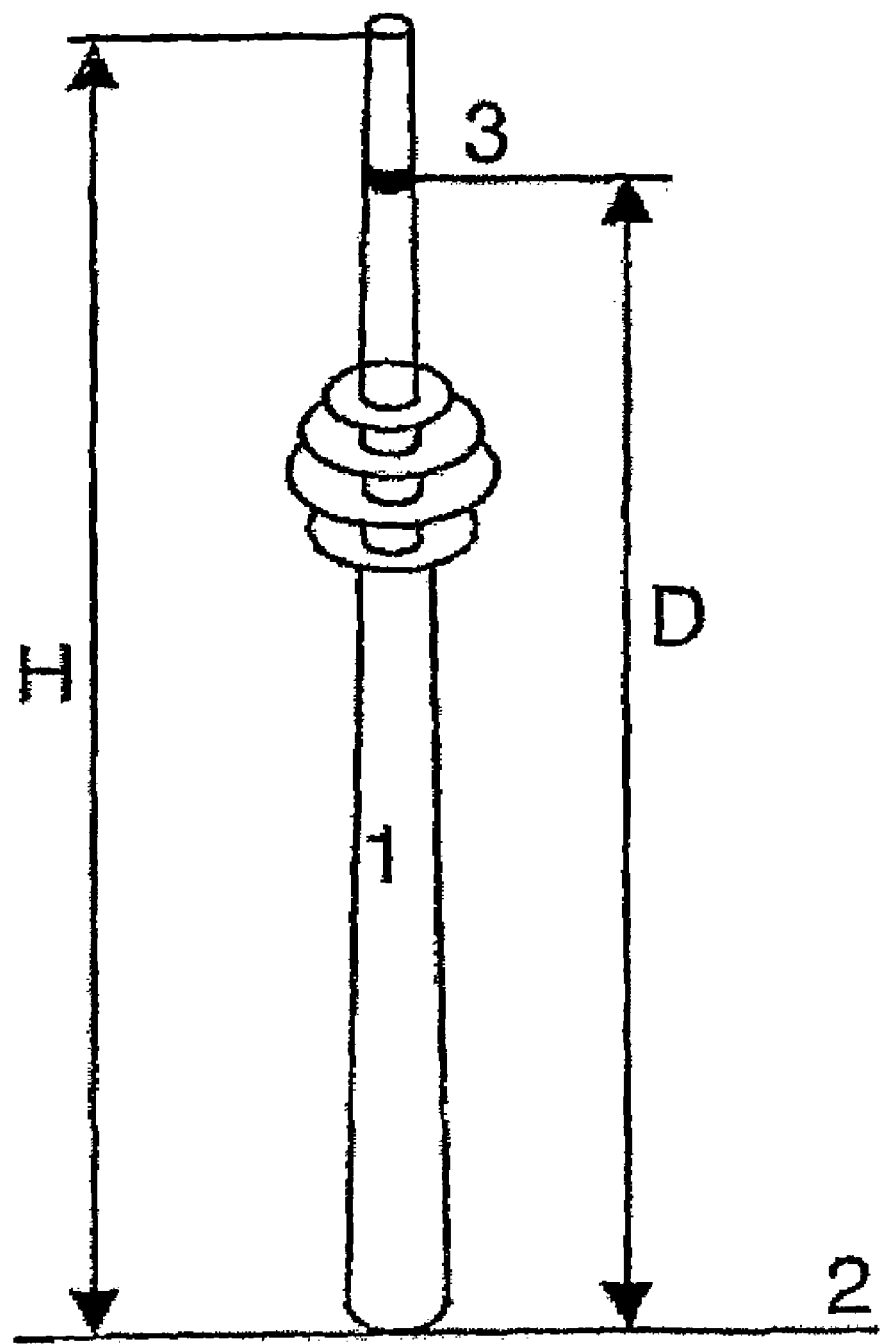
FIG. 1 shows a high site in the form of a tower in diagrammatic side elevation.

For the purpose of teaching the invention, preferred embodiments of the method and system of the invention are described in the sequel. It will be apparent to the person skilled in the art that other alternatives and equivalent embodiments of the invention can be conceived and reduced to practice without departing from the true spirit of the invention, the scope of the invention being only limited by the claims as finally granted.

A telecommunications radio system according to the invention makes it possible to cover a large area such as an entire town or a country from just one site with a dense sectorized system. This helps to avoid virtually all of the problems as described in the background section of this application.

Using a concentrated site, i.e. a high site from which a large area can be covered, results in considerable savings in the fixed core network since fewer base stations need to be connected to the fixed core network. Other savings can be made in construction and maintenance time and costs, and in synergy from sharing extensive power supplies and cables.

The construction of a base station at a concentrated site can be completed "overnight", resulting in a competitive advantage since an extensive and homogenous network without any gaps would be available immediately.

The invention is applicable to any telecommunications radio network using sectorized areas, such as among others GSM, TDMA, CDMA and UMTS. The following description uses UMTS as an example.

An UMTS telecommunications radio system could be realized using an already existing TV tower with a height of at least 50 m from erection ground, preferably with a height of 90 m to 320 m. As an example the TV tower has a height of 280 m.

In this embodiment, in order to achieve sufficient power flow density at ground level and to obtain sufficient capacity in the covered area, sectorization has to be dense. This can be achieved by using two rings of antennas, the outer one being sectorized denser because of the higher circular surface due to the quadratic increase of the surface with increasing distance. The inner ring would comprise 24 antennas defining 24 sectors, thus 15-degree horizontal angular range in each case. The outer ring would comprise 72 antennas defining 72 sectors, thus 5-degree horizontal angular range in each case. Antennas are used which are able to create small beams with high gain. The vertical aperture angle of the inner antennas should be 10 degrees and would cover a distance range of 1 km–3.2 km at about 10 degrees tilt. The vertical aperture angle of the outer antennas should be 5 degrees and would cover a distance range of 3.2 km–6.4 km at about 2.5 degrees tilt. In this configuration, each sector (from inside or outside antennas) covers an area of about 1.33 square km.

This would result in a relatively uniform power flow density of −21 dBm/square meter in the entire area to be covered (at 10 W transmitting power per sector). On a mobile phone (OdBi antenna), this would correspond to a level of −49 dBm (assuming line of sight). With this level it should also be possible to achieve an adequate indoor coverage. An advantage of the invention as used in the example is that a homogenous network (without interference problems due to different propagation paths of different stations and path loss due to obstacles) can be built, thus making it possible to achieve high transmission capacities in the individual sectors. The number of sectors needed to cover all mobile devices with enough capacity depends on the size of the sectors and the required field strength. Due to overlapping at the edges of sectors, it is possible to compensate the loss of power with the aid of macrodiversity and a good soft handover can be achieved. An individual neighborhood cell planning, something which is required in traditional mobile communications radio networks, can be replaced by simple systematics: a maximum of 7 neighbors for a sector from the internal ring; a minimum of 3 (and/or 4) neighbors for a sector from the outer ring.

In this embodiment, the system should use antennas all operating at only one frequency. This means that about 50,000 customers (10 applications per UMTS channel simultaneously, 96 sectors and 20 mErl/customer each) would be conceivable, which should be sufficient for a UMTS network in the beginning.

Future capacity demands are safeguarded as well. Sectors can be shape shifted to change their capacity by switching on or off antennas thus enabling or disabling entire sectors, or changing the horizontal angular range and/or the vertical aperture angle and/or the tilt of antennas. In case of particularly heavy traffic within a sector, the origin of this traffic can be determined very accurately since the angle as well and the distance (calculated from the time delay) are known. Consequently, a UMTS site with a base station, which would serve this "hot spot" locally, could be build there at a second frequency other then the first frequency. The advantage would be that one would not have to make conjectures regarding the position of "hot spots", but that these can be determined quite specifically and that further base stations will then be build only there.

By using a high site (high being defined as at least 50 m from erection ground) and creating a large number of sectors it is possible to cover a large area for mobile telecommunications services. Because there is a clean signal between the antenna and a mobile device (the signal is clean because the base station is located at such a high site that there is no interference from buildings surrounding the mobile device and because there are no surrounding base stations interfering) and because of a high trunking gain (because of the high number of sectors the antennas use small beams with high gain), even in urban areas large areas can be covered from the base station on the high site.

The tower 1 shown in FIG. 1 has a height H of at least 50 m, preferably about 90 m to 320 m. Instead of a tower any high structure can be used, such as, but not limited to, a chimney, a radio tower, a skyscraper, or even a zeppelin hovering at a fixed location. At distance D from the erection ground 2 there is arranged at least one ring 3 of antennas, each antenna defining a sector. Distance D should be in the range of 50 m to 450 m. It is possible that ring 3 is located in the top of the tower, resulting in a distance D equal to height H.

Figure 2:
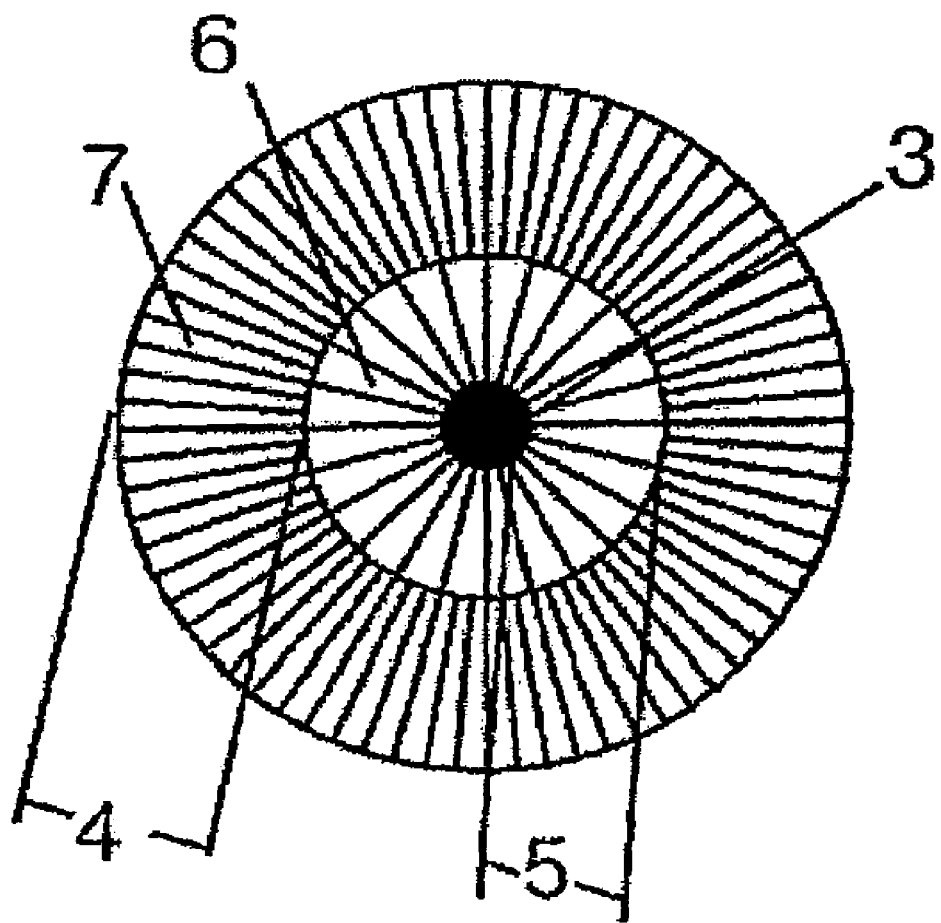
FIG. 2 shows a top plan view of a tower with two rings of antennas arranged concentrically with respect to each other and in a sectorized arrangement.

In an embodiment according to FIG. 2 two rings of antennas, an outer ring 4 and an inner ring 5, are provided. The inner ring 5 has 24 sectors 6 of antennas, each comprising a 15-degree horizontal angular range. The outer ring 4 is subdivided into 72 sectors 7, each comprising a 5-degree horizontal angular range. In general using only one ring of antennas is possible as well when using at least 6 antennas defining 6 sectors.

The vertical aperture angle of the inner antennas is 10 degrees covering a distance in the range of 1 km to 3.2 km at about 10 degrees tilt. The vertical aperture angle of the outer antennas is 5 degrees covering a distance in the range of 3.2 km to 6.4 km at about 2.5 degrees tilt.

Consequently, each sector 6 or 7 (inside or outside) covers an area of about 1.33 square km.

Figure 3:
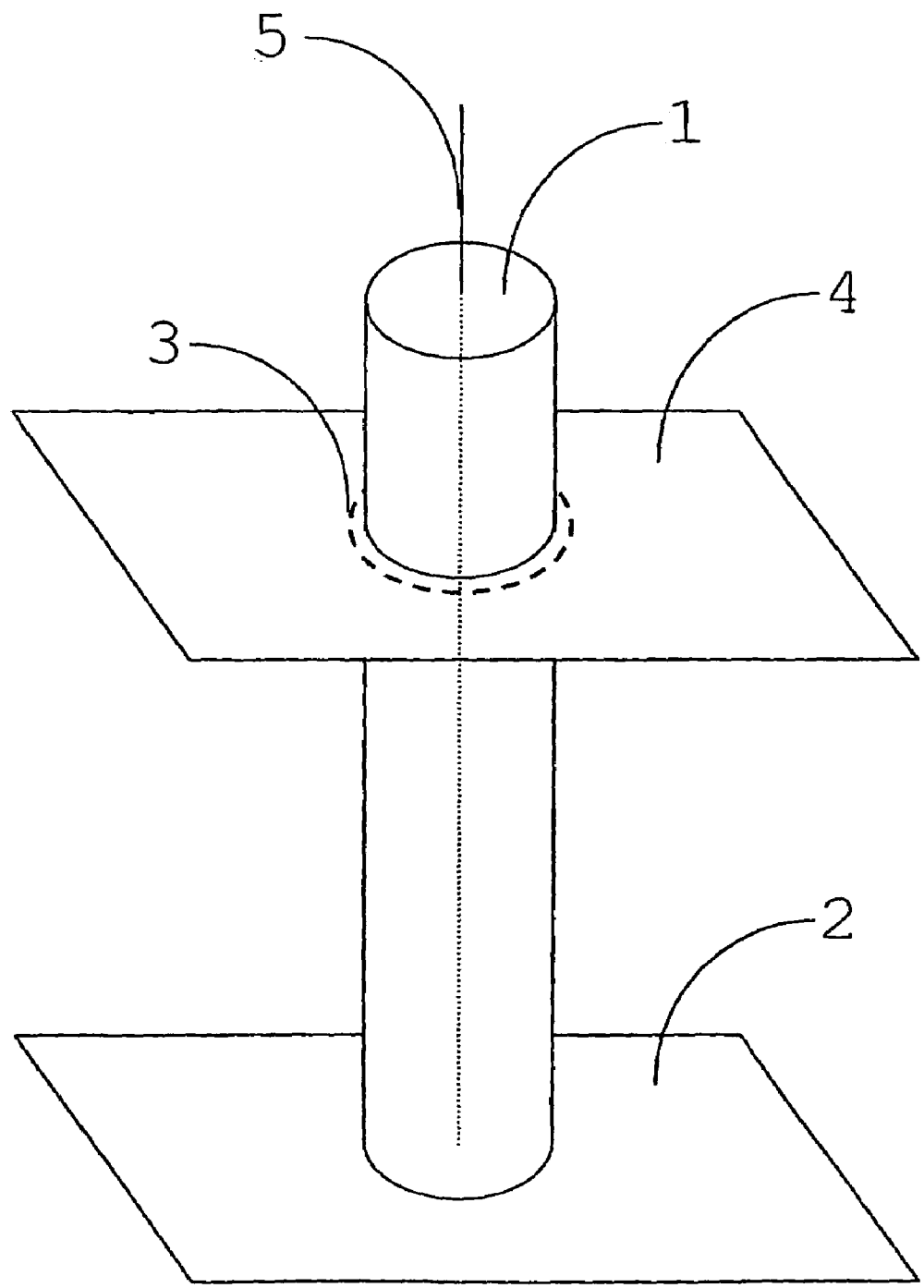
FIG. 3 shows another high site in diagrammatic side elevation.

In FIG. 3 another high site 1 is shown, which is located on the erection ground 2. Two or more antennas can be arranged in a concentric ring 3 in an orthogonal plane 4 of the longitudinal axis 5 of the high site 1. The antennas can be connected to the exterior of the high site, they can be connected to a frame, which is located around the high site, or any other construction arranging the antennas in the concentric ring can be used.

The invention claimed is:

1. A telecommunications radio system for mobile communication services comprising a first base station having a plurality of antennas and located at a site, the base station covering an area subdivided into a multitude of sectors by the antennas, wherein:

the site comprises a structure with a height of at least 50 m from erection ground;

the base station is located on the structure at a height of at least 50 m from erection ground; and the plurality of antennas having:

a first set of the antennas arranged in a first ring situated in a first plane orthogonal to and concentric with a longitudinal axis of the structure; and a second set of the antennas arranged in a second ring situated in a second plane orthogonal to and concentric with the longitudinal axis of the structure, wherein the antennas in the second set are different from and greater in number than the antennas in the first set, such that the second ring of antennas provides denser sectorization than that provided by the first set of antennas; and wherein the plurality of antennas results in a substantially uniform power flow density of approximately −21 dBm/square meter, in the area and at approximately ground level for an approximate 10 W transmitting power per sector.

2. The telecommunications radio system recited in claim 1 wherein the height of the structure is in the range of 90 m to 320 m from the erection ground and the base station is located on the structure at a height in the range of 90 m to 320 m from the erection ground.

3. The telecommunications radio system recited in claim 2 wherein each of said sectors is served by a separate one of the antennas.

4. The telecommunications radio system recited in claim 2 wherein at least one of the antennas is a phase-controlled antenna.

5. The telecommunications radio system recited in claim 4 wherein the multitude of sectors comprises six sectors.

6. The telecommunications radio system recited in claim 4 wherein the multitude of sectors comprises 12 sectors.

7. The telecommunications radio system recited in claim 4 wherein the multitude of sectors comprises 24 sectors.

8. The telecommunications radio system recited in claim 4 wherein the multitude of sectors comprises 48 sectors.

9. The telecommunications radio system recited in claim 1 in which the first plane is the same as the second plane.

10. The telecommunications radio system recited in claim 9 wherein at least one of the antennas on the second ring has a horizontal angular range that is smaller than a horizontal angular range of at least one of the antennas on the first ring.

11. The telecommunications radio system recited in claim 10 wherein at least one of the antennas on the first ring has a vertical aperture angle in the range of 8 to 12 degrees.

12. The telecommunications radio system recited in claim 10 wherein the at least one antenna on the second ring has a vertical aperture angle in the range of 3 to 6.5 degrees.

13. The telecommunications radio system recited in claim 10 wherein the area is subdivided into 24 sectors by the antennas on the first ring and 72 sectors by the antennas on the second ring.

14. The telecommunications radio system recited in claim 10 wherein shape and/or size of one or more of the sectors can be changed by switching on or off one or more of the antennas.

15. The telecommunications radio system recited in claim 10 wherein the shape and/or size of one or more of the sectors can be changed by changing the horizontal angular range of one or more of the antennas.

16. The telecommunications radio system recited in claim 10 wherein shape and/or size of one or more of the sectors can be changed by changing the vertical aperture angle of one or more of the antennas.

17. The telecommunications radio system recited in claim 16 wherein at least one of the antennas, not in either said first or second sets, is arranged in a third plane orthogonal to the longitudinal axis of the structure so as to cover an area in a proximity zone of the structure, the third plane being located below a height of 50 m from the erection ground.

18. The telecommunications radio system recited in claim 10 wherein a total number of sectors needed to cover the area is a function of a size of each of said sectors and a required field strength in said each sector.

19. The telecommunications radio system recited in claim 10 in which all of the antennas operate at one frequency.

20. The telecommunications radio system recited in claim 19 wherein a second base station operating at a different frequency, from said one frequency, is situated within the area.

21. A base station for use in a telecommunications radio system, the base station having a plurality of antennas and located at a site, the base station covering an area subdivided into a multitude of sectors by the antennas, wherein:

the site comprises a structure with a height of at least 50 m from erection ground;

the base station is located on the structure at a height of at least 50 m from erection ground; and the plurality of antennas having:

a first set of the antennas arranged in a first ring situated in a first plane orthogonal to and concentric with a longitudinal axis of the structure; and a second set of the antennas arranged in a second ring situated in a second plane orthogonal to and concentric with the longitudinal axis of the structure, wherein the antennas in the second set are different from and greater in number than the antennas in the first set, such that the second ring of antennas provides denser sectorization than that provided by the first set of antennas; and wherein the plurality of antennas results in a substantially uniform power flow density of approximately −21 dBm/square meter, in the area and at approximately ground level for an approximate 10 W transmitting power per sector.

22. Apparatus for use in a base station in a telecommunications radio system for mobile communication services, the base station being located at a site, the base station covering an area subdivided into a multitude of sectors with the sectors being served by a plurality of antennas, wherein:

the site comprises a structure with a height of at least 50 m from erection ground;

the base station has a plurality of antennas and is located on the structure at a height of at least 50 m from erection ground; and the apparatus comprising the plurality of antennas having:

a first set of the antennas arranged in a first ring situated in a first plane orthogonal to and concentric with a longitudinal axis of the structure; and a second set of the antennas arranged in a second ring situated in a second plane orthogonal to and concentric with the longitudinal axis of the structure, wherein the antennas in the second set are different from and greater in number than the antennas in the first set, such that the second ring of antennas provides denser sectorization than that provided by the first set of antennas; and wherein the plurality of antennas results in a substantially uniform power flow density of approximately −21 dBm/square meter, in the area and at approximately ground level for an approximate 10 W transmitting power per sector.

23. A mobile network comprising a telecommunications radio system for mobile communication services, the system having at least one base station, the base station having a plurality of antennas, the base station being located at a site and covering an area subdivided into a multitude of sectors by the antennas, wherein:

the site comprises a structure having a height of at least 50 m from erection ground;

the base station is located on the structure at a height of at least 50 m from the erection ground; and the plurality of antennas having:

a first set of the antennas arranged in a first ring situated in a first plane orthogonal to and concentric with a longitudinal axis of the structure; and a second set of the antennas arranged in a second ring situated in a second plane orthogonal to and concentric with the longitudinal axis of the structure, wherein the antennas in the second set are different from and greater in number than the antennas in the first set, such that the second ring of antennas provides denser sectorization than that provided by the first set of antennas; and wherein the plurality of antennas results in a substantially uniform power flow density of approximately −21 dBm/square meter, in the area and at approximately ground level for an approximate 10 W transmitting power per sector.

\* \* \* \* \*